15# United States Patent

Ryan et al.

(10) Patent No.: US 7,431,793 B2
(45) Date of Patent: Oct. 7, 2008

(54) PROCESS FOR BONDING SUBSTRATES OR PARTS AND SYSTEM INCLUDING CYANOACRYLATE ADHESIVE AND ACCELERATOR COMPOSITION

(75) Inventors: Bernard Ryan, Dublin (IE); Hanns Misiak, Haan (DE); James Houlihan, Dublin (IE)

(73) Assignee: Loctite (R&D) Limited, Dublin (IE)

( * ) Notice: Subject to any disclaimer, the term of this patent is extended or adjusted under 35 U.S.C. 154(b) by 416 days.

(21) Appl. No.: 10/495,817

(22) PCT Filed: Nov. 13, 2002

(86) PCT No.: PCT/IE02/00157

§ 371 (c)(1), (2), (4) Date: May 14, 2004

(87) PCT Pub. No.: WO03/042311

PCT Pub. Date: May 22, 2003

(65) Prior Publication Data

US 2005/0000646 A1 Jan. 6, 2005

(30) Foreign Application Priority Data

Nov. 14, 2001 (IE) ............................ S2001/0987

(51) Int. Cl.
*C09J 4/04* (2006.01)
*C09J 5/04* (2006.01)

(52) U.S. Cl. ................. 156/331.2; 156/331.6; 428/522; 502/167; 526/297; 526/298

(58) Field of Classification Search ............. 156/331.2, 156/331.6; 152/331.2, 331.6; 502/167; 526/298, 526/297; 428/522
See application file for complete search history.

(56) References Cited

U.S. PATENT DOCUMENTS

| 2,776,232 | A | * | 1/1957 | Shearer, Jr. et al. ......... 526/297 |
| 3,254,111 | A | | 5/1966 | Hawkins et al. |
| 3,260,637 | A | * | 7/1966 | Von Bramer ............. 156/331.6 |
| 3,640,972 | A | * | 2/1972 | Bolger et al. ............ 156/331.5 |
| 3,654,340 | A | | 4/1972 | Banitt |
| 3,836,377 | A | | 9/1974 | Delahunty |
| 4,695,615 | A | | 9/1987 | Leonard et al. |
| 4,814,427 | A | | 3/1989 | Fukuda et al. ............... 528/230 |
| 4,869,772 | A | | 9/1989 | McDonnell et al. |
| 5,314,562 | A | | 5/1994 | McDonnell et al. |
| 5,567,266 | A | | 10/1996 | Liu |
| 5,610,251 | A | | 3/1997 | Kneafsey et al. ............. 526/264 |
| 5,643,982 | A | | 7/1997 | Liu |
| 5,749,956 | A | | 5/1998 | Fisher et al. |
| 5,916,975 | A | * | 6/1999 | Bell et al. .................... 525/270 |
| 5,964,977 | A | * | 10/1999 | Sirdesai et al. ............... 156/305 |
| 6,547,917 | B1 | | 4/2003 | Misiak et al. |
| 6,995,227 | B2 | * | 2/2006 | Ryan et al. .................. 526/297 |

FOREIGN PATENT DOCUMENTS

| DE | 22 61 261 | C3 | 4/1980 |
| DE | 40 17 802 | A1 | 12/1991 |
| DE | 198 59 638 | A1 | 7/2000 |
| EP | 0 271 675 | A2 | 6/1988 |
| EP | 0 579 476 | B1 | 1/1996 |
| EP | 0 822 242 | A2 | 2/1998 |
| GB | 1 230 560 | | 5/1971 |
| JP | 59 066 471 | A | 4/1984 |
| JP | 62 018 485 | A | 1/1987 |
| JP | 62 022 877 | A | 1/1987 |
| JP | 62-195071 | * | 8/1987 |
| JP | 03 207 778 | A | 9/1991 |
| JP | 5-140512 | * | 6/1993 |
| JP | 6-299124 | * | 10/1994 |
| JP | 2002-20700 | * | 1/2002 |
| WO | WO 00/39229 | A1 | 7/2000 |
| WO | WO 01/85861 | * | 11/2001 |
| WO | WO 2001/085861 | A1 | 11/2001 |

* cited by examiner

*Primary Examiner*—Steven D Maki
(74) *Attorney, Agent, or Firm*—Steven C. Bauman

(57) ABSTRACT

An activator composition for accelerating hardening and achieving cure-through-volume of cyanoacrylate adhesives) comprising; (a) one or more compounds selected from the group consisting of :(i) pyrazine; or a pyrazine derivative; said pyrazine derivative being pyrazine substituted with at least one electron-releasing group; (ii) pyridine N oxides substituted with at least one electron-releasing group; or (iii) 2,6 pyridines being pyridines substituted in the 2- and 6-positions by substituents, at least one of the substituents being electron-releasing provided that both substituents are not methyl; and (b) a volatile solvent carrier for the compound.

16 Claims, No Drawings

PROCESS FOR BONDING SUBSTRATES OR PARTS AND SYSTEM INCLUDING CYANOACRYLATE ADHESIVE AND ACCELERATOR COMPOSITION

FIELD OF THE INVENTION

This invention relates to activator compositions, particularly well suited for accelerating the hardening of cyanoacrylate adhesives. The invention further relates to a process for the accelerated bonding of substrates using cyanoacrylate adhesives.

BRIEF DESCRIPTION OF RELATED TECHNOLOGY

Adhesive compositions based upon cyanoacrylate esters are well known and have found extensive use, because of their rapid cure speed, excellent long-term bond strength, and applicability to a wide variety of substrates. They generally harden after only a few seconds, after which the joined parts exhibit at least a certain degree of initial strength.

If the cyanoacrylate (CA) adhesive is conventionally applied in a relatively thick layer in the joint gap or relatively large amounts of adhesive are applied so that relatively large drops of adhesive protrude from between the parts to be joined, rapid hardening throughout the adhesive may rarely be achieved, i.e. cure-through-gap or cure-through-volume (CTV) performance may be unsatisfactory.

With certain substrates, particularly substrates having acidic surfaces, such as wood or paper, the polymerisation reaction may be retarded, often times to an unmanageable extent. Moreover, unless the adhesive is gelled or rendered thixotropic by appropriate additives to confer such properties, the wood or paper substrates, due to their porosity, tend to draw the adhesive out of the joint gap by capillary action before hardening has taken place in the gap.

Heretofore efforts have been made to accelerate the polymerisation of such CA adhesives by means of certain additives. Addition of accelerators directly to the adhesive formulation is possible to only a very limited extent, however, since substances having a basic or nucleophilic action, which would normally bring about a pronounced acceleration of the polymerisation of the cyanoacrylate adhesive, are generally used, it is usually at the expense of the storage stability of such formulations.

Addition of such accelerators shortly before application of the adhesive results in virtually a two-component (two-part) system—in other words the adhesive and the accelerator are stored apart—the accelerator would not normally be mixed with the adhesive for storage purposes. However, such method has the disadvantage that the working life is limited after the activator has been mixed in. In addition, with the small amounts of activator that are required, the necessary accuracy of metering and homogeneity of mixing are difficult to achieve. Moreover, use of such a two-part system is often seen as cumbersome to the end user, and sometimes only modestly improves the intended result.

Activators are also used in the form of a dilute solution which is either applied beforehand onto a substrate such as a part which is to be bonded, and/or is applied onto the adhesive where it is still liquid (before the adhesive has fully cured) after the substrates have been joined. The solvents used for such dilute solutions of activators are generally low-boiling organic solvents, so that they may be readily evaporated, leaving the activator on the substrate and/or on the adhesive.

Japanese Patent Application Nos. JP-A-62 022 877, JP-A-03 207 778 and JP-59-66471 propose the use of solutions of various amines in solution as accelerators for cyanoacrylate adhesives. U.S. Pat. No. 3,260,637 of von Bramer discloses the use of a range of organic amines (excluding primary amines) as accelerators for cyanoacrylate adhesives, particularly for use on metallic and non-metallic substrates.

N,N-dimethyl-p-toluidine has been widely used as an accelerator for the accelerated hardening of cyanoacrylate adhesives. This chemical provides a short duration of the surface activation, which does not permit long waiting times between application of the accelerator solution beforehand to the substrates to be bonded and the subsequent bonding process. In addition, the use of N,N-dimethyl-p-toluidine in some countries oftentimes involves rigorous regulatory labelling requirements.

Basicity of an accelerator substance is not a sufficient criterion for identifying solutions which are acceptable in practice in terms of application technology. Many substances, such as alkylamines, 1,2-di-(4-pyridyl-ethane), 4,4'-dipyridyl disulfide, 3-(3-hydroxypropyl)pyridine, 1,2-bis(diphenylphosphino)-ethane, pyridazine, methylpyridazine or 4,4'-dipyridyl, are so basic or nucleophilic that spontaneous superficial hardening takes place at the adhesive interface (shock hardening) before the activator is able to initiate polymerisation throughout the liquid adhesive (usually a drop or layer) by dispersion processes such as by convection and diffusion. The result is that an often cloudy polymerisation occurs at the surface only. With other compounds, such as oxazoles, the basicity is evidently too low, and the hardening is often too slow for practical purposes.

German Patent DE-A-22 61 261 proposes accelerator substances containing the structural element —N=C—S—, including 2,4-dimethylthiazole. U.S. Pat. No. 5,567,266 (Liu) and U.S. Pat. No. 5,643,982 (Liu) describe accelerator compositions comprising amine compounds. EP 0 822 242 and U.S. Pat. No. 5,749,956 (Fisher et al.) describe non-ozone depleting non-flammable co-solvent useful for carrying inter alia accelerators.

European Patent Publication No. 0 271 675 A2 of Three Bond Co. Ltd. describes a primer for CA adhesive for use in bonding non-polar or highly crystallized resins such as polyolefins, polyethyleneterephthalates, nylons, fluorine-containing resins, soft PVC films and the like which are notorious as being ordinarily difficult to bond. The primer comprises (A) a compound selected from the group consisting of benzene ring compounds having aldehyde groups and nitrogen or oxygen atom-containing heterocyclic compounds having aldehyde groups (such as 2-pyridine carboxylaldehyde, 2,6-pyridine carboxylaldehyde and pyrrole 2-carboxylaldehyde), and (B) an organic amine compound. The EP '675 publication states that in bonding non-polar or highly crystallized resins using a CA adhesive the primer instantaneously exhibits a high bonding strength at ambient temperature by simply applying such primer onto a surface of one of the resins, applying the CA adhesive onto a surface of the other resin and bringing both surfaces into contact with each other, thus achieving "zero gap" and an instantaneous high bonding strength.

British Patent Specification No. 1 230 560 of International Chemical Company Limited (ICC) describes CA adhesive compositions containing certain substituted heterocyclic compounds as accelerators. The compositions may be presented in a two-part form, the first part comprising the CA adhesive and the second part comprising at least one of the substituted heterocyclic compounds, preferably in solution in an organic solvent. In the compositions in which the heterocyclic compound is an iminoethylene-substituted triazine or pyrimido-pyrimidine, the heterocyclic compound is invariably present in one part of a two-part composition because iminoethylene-substituted triazines and pyrimido-pyrimidines accelerate the polymerisation so rapidly they must be kept apart from the CA composition before use.

Japanese Patent Abstract Publication No. 62018485 of Alpha Giken KK also describes a primer for a CA adhesive and is not concerned with an activator for good CTV performance.

Activator solutions are often applied by spraying. There is a demand for activator solutions which can be applied in excess volumes (e.g. as drops) onto an adhesive already present on a substrate (e.g. in the form of a bead or fillet).

Aliphatic hydrocarbons such as heptane are often used as a carrier for CA activators.

Notwithstanding the state-of-the-art, it would be desirable to provide new activators and combinations thereof with different physical properties from the activator substances than those known heretofore. In addition, it would be desirable for such activators to have a pronounced accelerating action on the cyanoacrylate adhesive and low volatility. Such physical properties will allow for the application of the activators either onto the substrate to be bonded prior to application of the cyanoacrylate adhesive or after application of the cyanoacrylate adhesive onto the substrate to be bonded as an overspray. It would also be desirable to find chemicals useful as activators for cyanoacrylate adhesives which are subject to regulatory labelling requirements less rigorous than those currently in place for N,N-dimethyl-p-toluidine.

SUMMARY OF THE INVENTION

According to one aspect, the present invention provides a composition (in particular suitable for use as an accelerator composition for CTV of cyanoacrylate adhesives) comprising:

(a) one or more compounds selected from the group consisting of:

(i) pyrazine; or a pyrazine derivative;
said pyrazine derivative being pyrazine substituted with at least one electron-releasing group;

(ii) pyridine N oxides substituted with at least one electron-releasing group; or (iii) 2,6 pyridines being pyridines substituted in the 2-and 6-positions by substituents, at least one of the substituents being electron-releasing provided that both substituents are not methyl; and (b) a volatile solvent carrier for the compound.

In the groups (i) to (iii) above (the groups (i) to (iii) are used for convenience and mixtures of compounds within a designated group and/or between groups is encompassed by the use of the phrase "at least one") the electron releasing effect of the substituent is measured relative to hydrogen—in other words a substituent which is considered more electron-releasing than a hydrogen substituent is desired. Usually the electron-releasing effect would be manifested in a net increase in the base strength of the substituted compound compared to the corresponding Substituted compound. Such a net increase in the base strength of the substituted compound compared to the corresponding unsubstituted compound is desirable for all compounds of groups (i) to (iii) above.

This base strength effect is particularly desirable for the substituted pyrazines of group (i) and the pyridine N-oxides of group (ii).

A net increase in the base strength of the substituted compound compared to the corresponding unsubstituted compound is seen as desirable also for the 2,6 pyridines of group (iii). In the group (iii) compounds the proximity of the substituents of these compounds to the N atom of the heterocycle also has an effect on the nucleophilicity of the (N atom) of the compounds which is thought to occur due to steric hindrance effects. In this respect it is desirable that the compounds of group (iii) are not substituted in both the 2-and 6-position by methyl. The present inventors have found that such substitution (for example in lutidine-2,6-dimethyl pyridine) results in a compound which is too reactive toward cyanoacrylate (both substituents being electron-releasing and together not providing sufficient steric hindrance) and does not achieve the desirable effects set out above. Accordingly at least one of the substituents in the 2- or 6-positions should not be methyl and desirably at least one of those substituents is more sterically hindering toward the N atom of the heterocycle than a methyl group. It may be that both substituents are each more sterically hindering than a methyl group would be in the 2-and 6-positions.

The compounds of groups (i) to (iii) may be additionally substituted with one or more other groups such as one or more electron-withdrawing and/or electron-releasing groups and/or groups that are neither electron-withdrawing nor electron-releasing. Overall it is desirable that the net effect of all substituents is to increase the base strength of the substituted compound as compared to the unsubstituted one.

In the case of pyrazines where there are two N heteroatoms it is desirable that each N heteroatom is sterically hindered each desirably by two N heteroatom adjacent groups particularly where there are two electron-releasing groups. Desirably both groups are electron-releasing groups. In this respect N heteroatom adjacent position is used to mean the substituent is on a carbon atom of the heterocycle which is directly bonded to a N heteroatom of the heterocycle.

In the case of pyridine, the substituent(s) is (are) desirably sufficiently bulky to decrease the nucleophilicity of the N heteroatom(s) of the heterocycle. In other words the substituents should be such as to make the compound less reactive (as accelerator) toward a cyanoacrylate adhesive. Less reactive is used herein in the comparative sense against the parent pyridine compound.

Preferably the electron releasing substituent(s) are selected from one or more of straight chain, branched chain, or cyclic (each optionally substituted) alkyl groups particularly where there are two electron-releasing. Typically up to 40 carbon atoms may be present in the substituent though this upper limit is not seen as critical in at least as so far as electron-releasing effects are to be considered. Typical substituents such as methyl, ethyl, propyl (in particular n-propyl or iso propyl), butyl (in particular n-butyl, iso butyl, tert butyl), pentyl such as n-pentyl or cyclopentyl, or hexyl such as cyclohexyl may be employed.

These chains may themselves be further substituted (provided that the substitution results in an electron-releasing substituent). The additional substituent(s) may be one or more substituents selected from the group consisting of:

halo, $CR=CR^1R^2$, $CF_3$, $CCl_3$, $OC(O)R$, $COOR$, $COR$, $OR$, $SR$, $CONR^1R^2$, $NO_2$, $NO_3$, $SOR$, $SO_2NR_2$, $NRSO_2R$, $SO_2R^3$, $SO_3R^3$, $PO(OR^3)_2$ and optionally substituted $C_6$-$C_{20}$ aryl, or aryloxy, $CSOR^3$, $COONR^3{}_2$, $NRCOOR$, $NRCOR$, $N=N-R^3$, $OOR^3$, $SSR^3$, $OC(O)$ $OR^3$, $N(OR^3)_2$, $P(OR^3)_2$, $SOR^3$, $OSR^3$, wherein R, $R^1$ and $R^2$ (which may be the same or different) are H, optionally substituted $C_1$-$C_{10}$ alkyl, or optionally substituted $C_6$-$C_{20}$ aryl, and $R^3$ is optionally substituted $C_1$-$C_{10}$ alkyl, or optionally substituted $C_6$-$C_{20}$ aryl. Halo includes chloro, bromo, fluoro and iodo. Pseudohalo-radicals such as CN, SCN, OCN, NCO, NCS are also included within the group of useful substituents.

Some electron-withdrawing groups which can be employed for further substitution directly on the heterocycle include hydroxy, methoxy, methanol, thio and thiol.

Specific examples of compounds of groups (i) to (iii) include compounds utilised in the worked examples below.

Mixtures of activators can be used both from within those of the present invention and with those of the co-pending International application no. PCT/IE 01/00063 (filed on 11 May 2001 with the applicant Loctite (R&D) Limited) the entire contents of which are incorporated herein by reference. For example an intelligent selection of activators would be to combine an activator with good pre-spray properties (such as 4-methyl pyridine-N-oxide from the present invention or from 2,2' dipyridyl disulphide or 5-nitroquinoline (from PCT/IE 01/00063) with some activators (for example the pyrazines that have good post spray properties.

Specific examples include 6-methyl-2-pyridine methanol or 2,3-dimethyl or 2,5 dimethyl or 2-methyl-3-n-propyl or 2 methoxy 3 methyl substituted pyrazines separately mixed with 2,2' dipyridyl disulphide or 5-nitroquinoline (from PCT/IE 01/00063) or mixed with 4-methyl pyridine n-oxide described herein. Also within the ambit of the present invention are mixtures containing more than one activator with good post spray properties with more than one activator with good pre spray properties.

The compositions of the present invention may additionally comprise a component:

(c) an organic compound containing the structural element, —N═C—S—S—.

According to a special feature, the present invention provides an activator composition for the accelerated hardening of cyanoacrylate adhesives, wherein the activator comprises a mixture of an aromatic heterocyclic compound according to the composition of the invention described above and an organic compound having the structural element, —N═C—S—S—.

According to a further feature, the present invention provides an activator composition for the accelerated hardening of cyanoacrylate adhesives, wherein the activator comprises a mixture of a composition comprising components (a), (b) and (c) above where the compound of group (c) is an organic compound having the structural element, —N═C—S—S—, more particularly the structural element, —N═C—S—S—C═N—, more especially —N═C—S—S—C═N— wherein the N═C and C═N double bonds are parts of aromatic heterocyclic rings.

The activator compositions of the present invention are for the accelerated hardening of a cyanoacrylate adhesive throughout the adhesive. The compositions of the invention are particularly directed to good CTV performance, in particular accelerated hardening throughout the adhesive, in drops of adhesive or relatively large layers of adhesive in a joint gap. A joint gap is a gap between two surfaces (often each surface is on a separate substrate on a separate substrate though surfaces on the same substrate are also of interest) which are spaced apart from each other. In this respect the term "spaced apart" is used to define a relationship between substrates which defines the gap between surfaces as larger than the "zero gap" achieved when two substrate surfaces are in contact. The term zero gap is often employed to refer to the direct contact between surfaces allowing for irregularities/imperfections on the surface which mean that perfect contact is not achieved. In general (and in particular for successful CTV through a bulk of cyanoacrylate) a gap having a greater width than 10 microns is of interest. The depth of the adhesive drop or layer perpendicular to the substrate surface is suitably in the range 0.5 mm -2 mm, particularly 0.75 mm -1.25 mm.

In the said organic compound containing the structural element —N═C—S—S—, the N═C double bond may optionally be part of an aromatic system, which may suitably be monocyclic, bicyclic or tricyclic. For example, the N═C double bond may suitably be part of an aromatic heterocyclic ring having one or more N hetero atoms in the ring, optionally with one or more other hetero atoms selected from S and O. The heterocyclic ring may be substituted.

Desirably the said organic compound contains the structural element —N═C—S—S—C═N—, in which case both the N═C double bond and the C═N double bond may optionally be part of aromatic systems as described above, suitably two similar aromatic systems. More desirably the said organic compound is selected from dibenzothiazyl disulfide, 6,6'-dithiodinicotinic acid, 2,2'-dipyridyl disulfide, and bis(4-t-butyl-1-isopropyl-2-imidazolyl) disulfide. Of course, combinations of these organic compounds may also be used. Organic compounds having structural element —N═C—S—S—, which are useful as accelerators for accelerating the curing of CA adhesives if diluted in a solution, are described in WO 00/39229 and the corresponding U.S. patent of Henkel KGaA, the entire contents of both of which are incorporated herein by reference.

In a further aspect the present invention also relates to the use of at least one aromatic heterocyclic compound having at least one N hetero atom in the ring(s) and substituted on the ring(s) with at least one electron-releasing group in the manufacture of a cure through volume accelerator composition for cyanoacrylate adhesives.

In this further aspect said at least one aromatic heterocyclic compound may be a member selected from the group consisting of pyridines, quinolines, pyrimidines and pyrazines substituted on the heterocycle ring or at least one of the heterocycle rings with at least one electron-releasing group.

An aromatic heterocyclic compound may suitably be monocyclic, bicyclic or tricyclic. The N hetero atoms(s) may be present in one or more of the rings. Two or more heterocyclic rings may be fused, or a heterocyclic ring may be fused to one or more carbocyclic rings. A heterocyclic ring may suitably be a 5- or 6-membered ring and may suitably have one or two N-atoms in the ring. A 6-membered heterocyclic ring is particularly suitable. In the case of two fused heterocyclic rings, the total number of N-atoms is suitably not more than three. The aromatic heterocyclic compounds are suitably substituted on the ring carbon atoms. A carbocyclic ring fused to a heterocyclic ring may suitably have 6 carbon atoms and/or may be an aromatic ring. A compound comprising a heterocyclic ring fused to a carbocyclic ring may be substituted by electron-withdrawing group(s) on either or both of the heterocyclic and carbocyclic rings.

In the various aspects of the invention described above the number of electron-releasing group(s) (which may be the same or different) may be from 1 to 3 groups on the ring or per ring, for example 1 or 2 groups on the ring or per ring.

The criterion that the electron-releasing group increases the base strength of the substituted compound compared to the corresponding unsubstituted compound may be determined by pKa measurement in water under standard conditions (e.g. 25° C. and zero ionic strength) by conventional means or using a software package which calculates pKa for the reaction of the positively charged protonated base $BH^+$ with water as indicated in the reaction such as "ACD/pKa Calculator" available from Advanced Chemistry Development, 133 Richmond Street West, Suite 605, Toronto, ON N5H 2LS, Canada. An increase in base strength is indicated by an increase in pKa value. All of the quoted pKa values were calculated using the aforementioned ACD software.

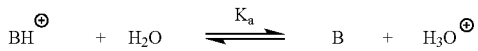

As above the heterocyclic compound substituted with electron-releasing groups may also be substituted on the ring with one or more electron-withdrawing groups. Again it is desirable that overall the base strength is increased compared to the corresponding unsubstituted compound.

According to a further aspect, the present invention includes the use of a composition as defined above for the accelerated hardening of a cyanoacrylate adhesive. The composition may be applied to a substrate before application of the cyanoacrylate adhesive thereto, and/or the composition may be applied to the cyanoacrylate adhesive after application of the adhesive to a substrate.

According to a further aspect, the present invention provides an adhesive system comprising a cyanoacrylate adhesive together with a composition as defined above. Suitably, the composition as defined above is held separately from (i.e. does not contact) the adhesive prior to application on a substrate.

According to another aspect, the present invention provides a process for the bonding of substrates or parts, characterised by either of the following series of steps:

(a) dispensing an activator composition as defined above onto at least one surface of the substrates or parts to be joined;
(b) optionally exposing solvent or other liquid vehicle in the activator composition to air, optionally with heating and/or with the aid of a fan;
(c) optionally holding the substrate or part having the activator composition thereon for a retention or shipping period,
(d) applying a cyanoacrylate adhesive to at least one substrate or part;
(e) joining the substrates or parts, optionally with manual or mechanical fixing, and (f) optionally subsequently dispensing the activator composition onto adhesive exposed from a joint gap;

or (i) applying a cyanoacrylate adhesive onto at least one surface of the substrates or parts to be joined;
(ii) joining the substrates or parts, optionally with manual or mechanical fixing;
(iii) dispensing an activator composition as defined above onto the adhesive before or after the step of joining the substrates or parts, and (iv) optionally exposing solvent or other liquid vehicle in the activator composition to air, optionally with heating and/or with the aid of a fan.

Suitably the retention or shipping period in step (c) may be in the range from several minutes to several days, for example from two minutes to forty-eight hours. Optionally the activator composition may be applied onto parts prior to their shipping, forwarding or delivery to an end-user, customer or contractor.

The present invention includes a bonded assembly of substrates or parts bonded by a process as defined above. The present invention also includes as an article of commerce a substrate or part having a composition as defined above applied thereto.

According to another aspect, the present invention provides an activator composition wherein component (b) the volatile organic solvent is a solvent mixture which comprises a volatile hydrocarbon and a cyclic ketone. Cyclic ketones as co-solvents would be expected to achieve better results in reducing the "halo effect" discussed in co-pending application no. PCT/IE01/00063 than linear ketones such as acetone, butanone, pentanone, hexanone, 4-methyl-2-pentanone, or octanone; than cyclic ethers such as dioxane or tetrahydrofuran; or than adhesive-miscible solvents such as ethyl acetate.

Suitably, the cyclic ketone is present in an amount of up to about 15%, especially up to about 12%, particularly up to about 10%, by weight of the solvent mixture. If an amount substantially greater than 10%, and particularly greater than 15% is used, there may be a risk that a plastic substrate will be attacked. Desirably, the cyclic ketone is present in an amount of at least about 2.5% by weight of the solvent mixture. Below this amount the reduction in the "halo effect" may not be sufficient for full visual satisfaction. Preferably, the cyclic ketone is present in an amount of at least about 3% by weight of the solvent mixture. At or above this level the presence of cyclic ketone is seen to be beneficial. Desirably, the cyclic ketone is present in an amount in the range of 3% to 7.5% by weight of the solvent mixture, particularly an amount in the range of 4% to 7% by weight of the solvent mixture.

A cyclic ketone may suitably be monocyclic or bicyclic.

Suitably the cyclic ketone is an optionally-substituted cyclic ketone, desirably an alicyclic ketone, having 3-10 carbon atoms in the ring. A substituted cyclic ketone maybe mono- or di-substituted on the ring with $C_1$-$C_5$ alkyl, more particularly $C_1$-$C_2$ alkyl.

One particular example of suitable cyclic ketone is cyclohexanone. Other examples include cyclobutanone, cyclopentanone, cycloheptanone and 2-methyl cyclopentanone. Examples of bicyclic ketones include 2-norbornanone, bicyclo[3.2.1]octan-2-one and bicyclo[2.2.2] octanone.

Desirably, the volatile hydrocarbon is an aliphatic hydrocarbon. Suitably, the volatile aliphatic hydrocarbon may have from 4 to 10 carbon atoms, particularly from 5 to 8 carbon atoms, and may be straight chain, branched or cyclic. One particular example of a suitable hydrocarbon is n-heptane.

In one aspect, the present invention relates to use of an activator composition as defined above for the accelerated hardening of a cyanoacrylate adhesive, particularly when the activator composition is applied to the cyanoacrylate adhesive after application of the adhesive to a substrate.

In an activator composition for the accelerated hardening of cyanoacrylate adhesives, the activator may suitably comprise a member selected from the group consisting of:

According to one aspect, the present invention includes the use of an activator composition as defined above for the accelerated hardening of a cyanoacrylate adhesive. The composition may be applied to a substrate before application of the cyanoacrylate adhesive thereto, but more suitably the composition is applied to the cyanoacrylate adhesive after application of the adhesive to a substrate.

According to a further aspect, the present invention provides an adhesive system comprising a cyanoacrylate adhesive together with an activator composition as defined above. Suitably, the activator composition as defined above is held separately from the adhesive prior to application on a substrate.

According to another aspect, the present invention provides a process for the bonding of substrates or parts, characterised by the following series of steps:
(i) applying a cyanoacrylate adhesive onto at least one surface of the substrates or parts to be joined;
(ii) joining the substrates or parts, optionally with manual or mechanical fixing;
(iii) dispensing an activator composition comprising a solution of one or more activators in a solvent mixture which comprises a volatile hydrocarbon and a cyclic ketone onto the adhesive before or after the step of joining the substrates or parts, and
(iv) optionally exposing the solvent mixture in the activator composition to air, optionally with heating or with the aid of a fan.

The process of the invention is particularly advantageous when at least one of the substrates has a surface of a dark colour or is transparent and/or at least one of the substrates is of a plastics material. However the invention is also useful with substrates of other materials such as cardboard, paper, or wood, particularly if the surface is of a dark colour.

The present invention includes a bonded assembly of substrates or parts bonded by a process as defined above.

Desirably, an activator composition comprises an amount of activator effective to accelerate hardening of a cyanoacrylate adhesive, the activator being carried in a suitable solvent mixture in accordance with the invention.

The solutions of the activator(s) may suitably contain the activator compound(s) in concentrations of from 0.01 to 10 g per 100 ml of solvent mixture; for example, from 0.05 to 5 g of activator substance are dissolved per 100 ml of solvent mixture.

Various conventional organic solvents are suitable as the hydrocarbon solvent (in the solvent mixture) for the activator(s) according to this aspect of the present invention, provided they have a sufficiently high volatility. Desirably, the boiling point of the solvent is below about 120° C., suitably below about 100° C., at ambient pressure. Although aromatic solvents such as toluene or xylene may be used, the hydrocarbon solvent is desirably an aliphatic hydrocarbon. Suitable solvents include specialised boiling point gasolines, but especially n-heptane, n-hexane, n-pentane, octane, cyclohexane, cyclopentane, methyl cyclopentane, methyl cyclohexane and isomers of them like isooctane, methylhexanes, methylpentanes, 2,2-dimethyl butane (neohexane), or mixtures thereof, as well as petroleum benzines and ligroin.

DETAILED DESCRIPTION OF THE INVENTION

An allyl group may be straight-chained, branched or cyclic and may be unsaturated, i.e. the term alkyl as used herein includes alkenyl and alkynyl. The heterocycle may be substituted with one or more alkyl or substituted alkyl groups that may be the same or different provided that at least one of the alkyl or substituted alkyl groups is electron releasing.

An optionally substituted alkyl group may be substituted with one or more of the following:
halo, $CR=CR^1R^2$, $CF_3$, $CCl_3$, $OC(O)R$, $COOR$, $COR$, $OR$, $SR$, $CONR^1R^2$, $NO_2$, $NO_3$, $SOR$, $SO_2NR_2$, $NRSO_2R$, $SO_2R^3$, $SO_3R^3$, $PO(OR^3)_2$ and optionally substituted $C_6$-$C_{20}$ aryl, , or aryloxy, $CSOR^3$, $COONR^3{}_2$, $NRCOOR$, $NRCOR$, $N=N-R^3$, $OOR^3$, $SSR^3$, $OC(O)OR^3$, $N(OR^3)_2$, $P(OR^3)_2$, $SOR^3$, $OSR^3$, wherein $R$, $R^1$ and $R^2$ (which may be the same or different) are H, optionally substituted $C_1$-$C_{10}$ alkyl, or optionally substituted $C_6$-$C_{20}$ aryl, and $R^3$ is optionally substituted $C_1$-$C_{10}$ alkyl, or optionally substituted $C_6$-$C_{20}$ aryl. Halo includes chloro, bromo, fluoro and iodo. Pseudohalo-radicals such as CN, SCN, OCN, NCO, NCS are also included within the group of useful substituents.

With the exceptions mentioned below, some electron-withdrawing groups which can be employed for further substitution directly on the heterocycle include OH, $OR^3$, SH, $SR^3$, $CR=CR^1R^2$ and aryl, aryloxy or thioaryl.

In the case of substitution of pyridine N oxide in the 4 position the groups OH, $OR^3$, F, $CR=CR^1R^2$ and aryl or aryloxy cause an increase in pKa. Similarly substitution of pyridine in the 4 position with $OR^3$, $CR=CR^1R^2$ , aryl or aryloxy cause an increase in pKa. The former and latter sets of groups may therefore be considered as electron releasing (within the scope of the definition of electron releasing described previously) in the respective cases of 4 substituted pyridine N oxide and 4 substituted pyridine . Substitution of pyridine N oxide in the 3 position with hydroxy or alkoxy also causes an increase in the pKa compared to pyridine N oxide In an organic compound containing the structural element —N=C—S—S—, in which the N=C double bond is part of a heterocyclic ring, the heterocyclic ring may be substituted for example with optionally substituted $C_1$-$C_{10}$ alkyl, optionally substituted $C_1$-$C_{10}$ alkoxy, optionally substituted $C_1$-$C_{10}$ alkoxyalkyl, halo, CN, $CF_3$, COOR, COR, OR, SR, $CONR^1R^2$, $NO_2$, SOR, $SO_2R^3$, $SO_3R^3$, $PO(OR^3)_2$ and optionally substituted $C_6$-$C_{20}$ aryl or aryloxy, $CSOR^3$, $COONR^3{}_2$, NRCOOR, $N=N-R^3$, $OOR^3$, $SSR^3$, $OOCOR^3$, $NOR^3{}_2$, $ON(COR^3)_2$, S-aryl, $NR^3{}_2$, SH, OH, $SiR^3{}_3$, Si$(OR^3)_3$, $OSiR^3{}_3$, $OSi(OR^3)_3$, $B(OR^3)_2$, $P(OR^3)_2$, $SOR^3$, $OSR^3$, wherein R,$R^1$ and $R^2$ (which may be the same or different) are H, optionally substituted $C_1$-$C_{10}$ alkyl, or optionally substituted $C_6$-$C_{20}$ aryl, and $R^3$ (which may be the same or different) is optionally substituted $C_1$-$C_{10}$ alkyl, or optionally substituted $C_6$-$C_{20}$ aryl.

Desirably, the activator(s) are dissolved in readily volatile organic solvents, such as hydrocarbons, carboxylic acid esters, ketones, ethers or halogenated hydrocarbons and carbonic acid esters or acetals or ketals. The solutions of the activator(s) may suitably contain the activator compound(s) in concentrations of from 0.01 to 10 g per 100 ml of solvent; for example, from 0.05 to 5 g of activator substance are dissolved per 100 ml of solvent.

When the activator composition contains a mixture of two activator compounds, the respective amounts of the activator compounds may vary and are only limited by respective amounts which will no longer be effective for the desired combination of properties. More particularly, when the activator composition contains a mixture of an aromatic heterocyclic compound substituted with at least one electron-withdrawing group and an organic compound having the structural element —N=C—S—S—, the activator compounds may suitably be present in amounts of about 0.1% to about 10% by weight of the said aromatic heterocyclic compound and about 0.01% to about 5% by weight of the said organic compound, more particularly about 0.05% to about 1%, of the said organic compound (c), based on the total weight of the activator composition.

Various conventional organic solvents are suitable as solvents for the activator(s) according to the present invention, provided they have a sufficiently high volatility. Desirably, the boiling point of the solvent is below about 120° C., suitably below about 100° C., at ambient pressure. Suitable solvents include specialised boiling point gasolines, but especially n-heptane, n-bromopropane, alcohols, for example isopropyl alcohol, alkyl esters of lower carboxylic acids, for example ethyl acetate, isopropyl acetate, butyl acetate, ketones, such as acetone, methyl isobutyl ketone and methyl ethyl ketone. Also suitable are ether solvents, ether esters or cyclic ethers, such as, especially, tetrahydrofuran. In the case of sparingly soluble activators, chlorinated hydrocarbons, such as dichloromethane or trichloromethane (chloroform), may also be used.

The activator compositions according to the present invention are suitable for the accelerated hardening of conventional cyanoacrylate adhesives which contain as the fundamental constituent one or more cyanoacrylic acid esters, suitably with inhibitors of free-radical polymerisation, inhibitors of anionic polymerisation and, optionally, conventional auxiliary substances employed in such adhesive systems, like fluorescence markers.

The activator compositions of the invention may use a combination of compounds from within any of the groups (i) to (iii). The particular electron-releasing group to be employed in any end use application can be selected for its effect on the activating ability of the activator. In particular the activity of the compound can be "tuned" by appropriate substitutions—either on the electron withdrawing group itself or by one or more additional substituents on the heterocycle. For instance electron-withdrawing groups may be employed if a particular electron-releasing group at a certain position on the heterocycle proves too activating for an end use. Similarly the position of the substitution(s) can be varied as appropriate.

The cyanoacrylic acid esters used in the adhesives are in the main one or more esters of 2-cyanoacrylic acid. Such esters correspond to the following general formula:

$$H_2C=C(CN)-CO-O-R^5.$$

In that formula, $R^5$ represents an alkyl, alkenyl, cycloalkyl, aryl, alkoxyalkyl, aralkyl or haloalkyl or other suitable group, especially a methyl, ethyl, n-propyl, isopropyl, n-butyl, isobutyl, pentyl, hexyl, allyl, methallyl, crotyl, propargyl, cyclohexyl, benzyl, phenyl, cresyl, 2-chloroethyl, 3-chloropropyl, 2-chlorobutyl, trifluoroethyl, 2-methoxyethyl, 3-methoxybutyl or 2-ethoxyethyl group. The above-mentioned cyanoacrylates are known to a person skilled in the art of adhesives, see Ullmann's Encyclopaedia of Industrial Chemistry, Volume A1, p. 240, Verlag Chemie Weinheim (1985) and U.S. Pat. Nos. 3,254,111 and 3,654,340. Preferred monomers are the allyl, methoxyethyl, ethoxyethyl, methyl, ethyl, propyl, isopropyl or butyl esters of 2-cyanoacrylic acid. The monocyanoacrylic acid esters represent the largest proportion by weight of the polymerisable monomers in the adhesive.

The mentioned cyanoacrylic acid esters may suitably be present in the adhesives in amounts of from 99.99 to 90 wt. %. Preference is given to cyanoacrylic acid esters the alcohol radical of which is derived from alcohols having from 1 to 10 carbon atoms, which may also be cyclic, branched or perfluorinated.

The cyanoacrylate adhesives according to the present invention may also contain an inhibitor of free-radical polymerisation. Such inhibitors are, for example, hydroquinone, p-methoxyphenol, but also sterically-hindered phenols, phenothiazine and the like.

The cyanoacrylate adhesives according to the present invention may also contain thickeners as further auxiliary substances. That is desirable especially when there are to be bonded porous materials which otherwise readily absorb the low viscosity adhesive. Many types of polymer may be used as thickeners, such as polymethyl methacrylate, other methacrylate copolymers, acrylic rubber, cellulose derivatives, polyvinyl acetate or polyalphacyanoacrylate. A usual amount of thickener is generally about 10 wt. % or less, based on the total adhesive. In addition to or instead of the thickeners, the cyanoacrylate adhesives according to the present invention may also contain reinforcing agents. Examples of such reinforcing agents are acrylic elastomers, acrylonitrile copolymers, elastomers or fluoroelastomers. Moreover, inorganic additives may also be used, for example silicates, thixotropic agents having a large surface area, which may be coated with polydialkylsiloxanes.

The cyanoacrylate adhesives according to the present invention may also contain substances for increasing the thermal stability thereof. There may be used for that purpose, for example, the sulfur compounds mentioned in European Patent specification No. 579 476.

In addition to or instead of the mentioned additives, the cyanoacrylate adhesives according to the present invention may also contain plasticisers. These serve to protect the resulting adhesive bond from brittleness. Such plasticisers are, for example, $C_1$-$C_{10}$ alkyl esters of dibasic acids, especially of sebacic acid, phthalic acid or malonic acid as well as esters of ethylene glycol, glycol or citric acid. Other plasticisers are diaryl ethers and polyurethanes and the like. Furthermore, the adhesive preparations according to the present invention may also contain colourings, pigments, aromatic substances (fragrances), extenders and the like, as well as fluorescing additives. Reference is directed to U.S. Pat. No. 5,749,956 (Fisher et al.), U.S. Pat. No. 4,869,772 (McDonnell et al.) and U.S. Pat. No. 5,314,562 (McDonnell et al.), the contents of which are incorporated herein by reference.

The activator compositions of the present invention are intended to be used with a wide variety of both metallic and non-metallic substrates, including substrates having acidic surfaces such as wood and paper or cardboard, and plastics substrates. A good CTV initiator (activator) should be a sufficiently slow initiator to allow effective initial mixing of the activator through the adhesive prior to polymerisation.

In the aspect of the invention using a cyclic ketone as a co-solvent, the advantage of the activator solutions of the invention is particularly evident on dark-coloured substrates.

The present invention will now be illustrated in greater detail.

EXAMPLES

In the Examples, the following abbreviations and terms are used:

DMPT = N,N-dimethyl-p-toluidine  
Heptane = n-heptane  
ETP = 2-ethane thiol pyrazine  
MPM = 6-methyl-2-pyridine-methanol  
MPPE = 2-(3-(6-methyl-2-pyridyl)-propoxy)ethanol.  
s = seconds  
CTV = cure through volume  
mins = minutes  
nm = not measured Loctite 401 (also called 401 herein), is a grade of Loctite ethyl cyanoacrylate-based adhesive. It is a low viscosity, fast curing, single component ethyl cyanoacrylate adhesive (see for example U.S. Pat. No. 4,695,615).

Loctite is a trade mark. The above Loctite product is commercially available from Loctite Corporation, Rocky Hill, Conn., USA or Loctite (Ireland) Limited, Dublin 24, Ireland.

The concentration of activator in an activator solution is expressed as % by weight based on the amount of solvent. The concentration of cyclohexanone is expressed as % by weight based on the total amount of solvent, the remainder being n-heptane.

Post Spray tests were carried out by applying a 10 ul drop of 401 adhesive onto a substrate and then spraying a chosen activator onto the drop. Full Cure Time is the time required for the adhesive drop to cure fully.

In pre spray tests the selected activator solution is sprayed onto the substrate before application of a 10 ul drop of 401 adhesive. On Part Time is the time interval between application of the spray and addition of the adhesive drop. "Initial" on part time is the time required for the activator solvent to evaporate leaving the substrate with a dry appearance, this was typically 20-30 seconds.

Pyrazines

Post Spray

The post spray cure speeds of a range of alkyl substituted pyrazines (1% solution in heptane solvent) that contained one or more electron releasing groups are shown in Table 1. It is evident that many of the pyrazines were more effective CTV agents than DMPT. In the case of pyrazines that contained electron releasing groups only, substituents adjacent to both nitrogen atoms showed more optimum reactivity.

Alkyl groups are activating by electron release and thought also to have a counteracting and deactivating effect by steric hindrance of the N atom. Thus, the steric hindrance provided by the tetra methyl derivative causes it to be the least reactive in terms of skinning speed of the pyrazines tested in Table 1. 2,3 and 2,5-dimethyl pyrazine are less reactive than 2-methyl pyrazine. The electron releasing effect of the methyl groups renders the aforementioned disubstituted pyrazines more reactive than unsubstituted pyrazine.

2,6-dimethyl pyrazine followed by 2-methyl pyrazine were the two most reactive pyrazines in terms of skinning speed that were tested. In both compounds one of the pyrazine nitrogen atoms is unhindered and the electron releasing effect of the methyl group(s) increased the respective reactivities compared to non-substituted pyrazine. The rapid skinning of these pyrazines is reflected by their slow CTV times with the most reactive 2,6-dimethyl derivative having a considerably slower CTV time (~14 minutes) than the less reactive 2-methyl derivative (CTV 1-3 minutes).

Substitution of an alkyl group in dialkyl substituted pyrazines by an electron withdrawing and sterically hindering alkoxy or thio groups reduced the reactivity compared to the dialkyl substituted pyrazine. 2-ethane thiol pyrazine (ETP) was less reactive than methyl pyrazine but was more reactive than unsubstituted pyrazine.

TABLE 1

Post spray CTV times of pyrazine and Pyrazine derivatives on CTV performance. CTV times were measured by spraying a 1% solution of the activator in heptane using a 10 ul drop of 401 adhesive on a cardboard substrate.

| Activator | Conc (%) | Post Skin (s) | Post CTV (s) | Pre-CTV (minutes) | pKa ± 0.2 |
|---|---|---|---|---|---|
| DMPT | 1.0 | no skin | 14 | 1-1.25 | 5.66 |
| Pyrazine | 1.0 | no skin | 10 | 7 | 1.0 |
| 2,6-Dimethyl | 1.0 | Immediate | ~840 | 8-10 | 1.98 |
| 2,6-Dimethyl | 1.0 | Immediate | ~900 | 8-10 | 1.98 |
| 2,6-Dimethyl | 0.1 | 5 | ~900 | — | " |
| 2,6-Dimethyl | 0.01 | no skin | 600 | — | " |
| 2-Methyl | 1.0 | 2 | 60-180 | — | 1.52 |
| 2-Methyl | 0.1 | 5 | 80 | — | " |
| 2-Methyl | 0.01 | no skin | 180 | — | " |
| 2-Ethane Thiol | 1.0 | Immediate light skin | 5 | 8 | 1.03 ± 0.3 |
| 2,3-Dimethyl | 1.0 | 2-4 | 10-15 | 3 | 1.97 |
| 2,5-Dimethyl | 1.0 | 2-4 | 10-15 | 20 | 1.97 |
| 2-methyl 3-n-propyl | 1.0 | no skin | 8-10 | 2-3 | 2.06 |
| 2,3,5-Trimethyl | 1.0 | no skin | 10 | 3 | 2.43 |
| Tetra methyl | 1.0 | no skin | 180 | 4-5 | 2.88 |
| 2-methoxy 3-methyl | 1.0 | no skin | 6 | 2 | 1.21 |
| 2 Methyl 3(5 or 6) Ethoxy Pyrazine | 1.0 | no skin | 7 | 7 35 | ~1.27 |

| Activator (1% conc.) | Post Skin (s) | Post CTV (s) | Pre-CTV (minutes) | pKa ± 0.2 |
|---|---|---|---|---|
| DMPT | No skin | 14 | 1-1.25 | 5.66 |
| Pyrazine | no skin | 10 | 7 | 1.0 |
| 2,6-Dimethyl | Immediate | ~840 | 8-10 | 1.98 |
| 2-Methyl | 2 | 60-180 | — | 1.52 |
| 2-Ethane Thiol | Immediate light skin | 5 | 8 | 1.03 ± 0.3 |
| 2,3-Dimethyl | 2-4 | 10-15 | 3 | 1.97 |
| 2,5-Dimethyl | 2-4 | 10-15 | 20 | 1.97 |
| 2-methyl 3-n-propyl | no skin | 8-10 | 2-3 | 2.06 |
| 2,3,5-Trimethyl | no skin | 10 | 3 | 2.43 |
| Tetra methyl | no skin | 180 | 4-5 | 2.88 |
| 2-methoxy 3-methyl | no skin | 6 | 2 | 1.21 |
| 2 Methyl 3(5 or 6) Ethoxy Pyrazine | no skin | 7 | 7 35 | ~1.27 |

Pre Spray

The pre spray cure speed of pyrazine and a range of pyrazines that contained at least one electron releasing group is shown in Table 2. Although the initial reactivity of 2-methoxy, 3-methyl pyrazine and the longer term reactivity of 2-methyl 3-n-propyl pyrazine were similar to that of DMPT. In all cases the pyrazines had slower CTV times than DMPT over an activator on part times of up to 1 hour.

TABLE 2

Pre spray CTV times of pyrazine and pyrazine derivatives.

| Activator (1% conc.) | On Part Time | Pre-Skin (s) | Pre-CTV (minutes) |
|---|---|---|---|
| DMPT | Initial | No skin | 1-1.25 |
| | 15 minutes | — | 2.8 |
| | 1 hour | — | 7 |
| Pyrazine | Initial | — | 7 |
| 2,3-Dimethyl | Initial | 20 | 3 |
| | 30 minutes | — | 9 |
| | 1 hour | — | 12 |
| | 16 hours | — | >90 |
| 2,5-Dimethyl | Initial | 60 | 20 |
| 2-methyl 3-n-propyl | Initial | " | 2-3 |
| | 30 minutes | | 7 |
| | 1 hour | | 8 |
| | 16 hours | | 60 |
| 2,3,5-Trimethyl | Initial | no skin | 3 |
| 2-methoxy 3-methyl | Initial | " | 2 |
| | 20 minutes | | 4 |

TABLE 2-continued

Pre spray CTV times of pyrazine and pyrazine derivatives.

| Activator (1% conc.) | On Part Time | Pre-Skin (s) | Pre-CTV (minutes) |
|---|---|---|---|
| | 1 hour | | 20 |
| 2 Methyl 3(5 or 6) Ethoxy Pyrazine | Initial 16 hours | | 7 35 |
| 2-Ethane Thiol | Initial | 5 | 8 |
| tetra methyl | Initial | 5 | 4-5 |
| 2,6-Dimethyl | Initial | " | 8-10 |

Pyrazines have the important property from a health and safety point of view that they are relatively non-toxic. Some are actually added to foods etc. as flavour enhancers. Alkyl, hydroxy, alkoxy and thio pyrazines are for example widely found in food and also added to edible products as flavour Pyridine N Oxides Pyridine N oxide was a very slow initiator. Introduction of electron releasing groups enhanced reactivity. The methoxy group in the 4 position (being, in that position, an electron releasing group) appeared to be too activating. However, 4-methyl and 2,4-dimethyl pyridine N-oxide (i.e. compounds substituted with electron-withdrawing group(s)) had good reactivity (CTV 30 seconds). A desirable property exhibited by the latter accelerator is that it cured the adhesive drop to a clear drop. The longer term (e.g. 30 minutes) pre spray performance (10 ul 401/cardboard substrate) of 4-methyl pyridine N-oxide was superior to that of DMPT (compare Tables 2 and 3).

TABLE 3

Post and Pre spray reactivity of 1% (unless otherwise indicated) pyridine N-oxide derivatives with 10 ul drop of 401 adhesive on a cardboard substrate.

| Pyridine-N-Oxide | Solvent | Conc. (%) | Post Spray (s) | Pre Spray On Part time | Pre Spray (mins) | pKa |
|---|---|---|---|---|---|---|
| 4-methoxy | IPA | 1.0 | Skin, no CTV | — | | 2.28 |
| 4-methoxy | IPA | 0.1 | Skin, no CTV | | | 2.28 |
| 2,4-dimethyl | IPA | 1.0 | 30 | — | | 1.83 |
| 4-methyl | IPA | 1.0 | 30 | initial | 4 | 1.41 |
| 4-methyl | IPA | 1.0 | — | 30 minutes | 4 | 1.41 |
| 4-methyl | IPA | 1.0 | — | 16 hours | 7 | 1.41 |

2,6 Disubstituted Pyridines

Pyridine and 2,6 lutidine were too reactive and only caused skinning in post spray tests. Replacement of one of the methyl groups in 2,6 lutidine with either the slightly electron withdrawing methanol or electron releasing propoxy ethanol group reduced reactivity sufficiently to allow good CTV of 401 adhesive. c.f. table 4

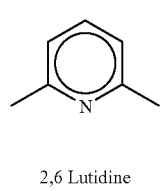

2,6 Lutidine

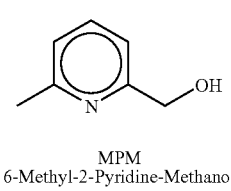

MPM
6-Methyl-2-Pyridine-Methanol

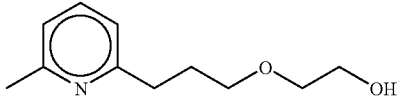

2-(3-(6-methyl-2-pyridyl)-propoxy) ethanol

TABLE 4

Post spray CTV Performance (401 adhesive) of 2,6 disubstituted pyridines

| Activator (1%) | Solvent | Post CTV (s) | pKa |
|---|---|---|---|
| 2,6 Lutidine | IPA | >300 | 6.67 |
| MPM | IPA | 25-30 | 5.73 |
| MPPE | Heptane | 60 | 6.4 | pKa Values

The pKa values of the compounds used in the Examples are given in Tables 1-4. Those of the parent compounds are given below:

Activator Calculated pKa (±0.2)

Pyridine N Oxide (parent) 0.73

Pyridine (parent) 5.32

Pyrazine (parent) 1.0

DMPT 5.66

Example 1

Post Spray tests were carried out by applying a 10 μl drop of adhesive onto a substrate and then spraying a chosen activator onto the drop. Full Cure Time is the time required for the adhesive drop to cure fully.

In Pre Spray tests the selected activator solution is sprayed onto the substrate before application of a 10 μl drop of adhesive. On Part Time is the time interval between application of the spray and addition of the adhesive drop.

The formulations of the invention show, or would be expected to show, at least one of the following properties:

1. No or no substantial loss of surface activation.
2. Fast cure after pre-activation.
3. No or no substantial shortcomings in cosmetics.
4. Fast through cure after post activation.
5. No or no substantial loss of bond strengths.

Activator solutions according to this invention would allow manufacturers to have long waiting periods between the steps of application of activator (surface activation) and application of adhesive (bonding parts).

Thus the invention can confer the following benefits:

Interruptions/breaks/hold-ups in production lines do not require repeated surface activation of the parts to be adhered.

Parts to be bonded can be activated in advance by the supplier or a contractor. This could be advantageous if manufacturer does not want to equip his production lines with activator application stages.

Large number of parts can be pre-treated in advance and be held in stock.

Although the invention has been described above, many modifications and equivalents thereof will be clear to those persons of ordinary skill in the art and are intended to be covered hereby, the true spirit and scope of the invention being defined by the claims.

The invention claimed is:

1. An accelerator composition adhesive system comprising in one part a cyanoacrylate adhesive and in a second part an accelerator composition for curing cyanoacrylate adhesives comprising:
   (a) one or more compounds selected from the group consisting of:
   (i) unsubstituted pyrazine; or a pyrazine derivative; said pyrazine derivative being pyrazine substituted with at least one electron-releasing group which substituent causes a net increase in the base strength of the substituted compound as compared to the corresponding unsubstituted compound;
   (ii) pyridine N oxides substituted with at least one electron-releasing group; and
   (iii) 2,6 pyridines being pyridines substituted in the 2- and 6-positions by substituents, at least one of the substituents being electron-releasing provided that both substituents are not methyl;
   (b) a volatile solvent carrier for the compound; and
   (c) an organic compound containing the structural element, —N═C—S—S— or 5-nitro guinoline.

2. A system according to claim 1 wherein in a compound of group (iii) at least one of the substituents is more sterically hindering than a methyl group.

3. A system according to claim 1 wherein in a compound of group (i) the heterocycle is substituted on at least one of the carbon atoms directly bonded to the N heteroatom.

4. A system according to claim 3 wherein the heterocycle is substituted on at least two carbon atoms each carbon atom being directly bonded to one of the N heteroatoms.

5. A system according to claim 1 wherein the electron-releasing group(s) are selected from one or more of straight chain, branched chain or cyclic, optionally substituted, alkyl groups.

6. A system according to claim 5 wherein said electron-releasing groups are optionally substituted methyl, ethyl, propyl, butyl or pentyl.

7. A system according to claim 1 wherein component (b) the volatile organic solvent is a solvent mixture which comprises a volatile hydrocarbon and a cyclic ketone.

8. A system according to claim 7 wherein the volatile hydrocarbon is an aliphatic hydrocarbon.

9. A reaction product of the one part of the system of claim 1 and the second part of the system of claim 1.

10. A bond formed between two surfaces by the reaction product of claim 9.

11. A process to accelerate hardening of a cyanoacrylate adhesive, steps of which comprise:
   (a) providing a cyanoacrylate adhesive according to claim 1,
   (b) providing an accelerator composition according to claim 1, and
   (c) contacting the cyanoacrylate adhesive with the accelerator composition.

12. A process for the bonding of substrates or parts, characterised by either of the following series of steps:
   (a) dispensing a composition from the second part of the system as according to claim 1 onto at least surface of the substrates or parts to be joined;
   (b) optionally exposing solvent or other liquid vehicle in the accelerator composition to air, optionally with heating and/or with the aid of a fan;
   (c) optionally holding the substrate or part having the accelerator composition thereon for a retention or shipping period,
   (d) applying a cyanoacrylate adhesive from the one part of the system of claim 1 to at least one substrate or part;
   (e) joining the substrates or parts, optionally with manual or mechanical fixing, and
   (f) optionally subsequently dispensing the accelerator composition onto adhesive exposed from a joint gap; or
   (i) applying a cyanoacrylate adhesive from the one part of the system according to claim 1 onto at least one surface of the substrates or parts to be joined;
   (ii) joining the substrates or parts, optionally with manual or mechanical fixing;
   (iii) dispensing an accelerator composition from the second part of the system as according to claim 1 onto the cyanoacrylate adhesive from the one part of the system according to claim 1 before or after the step of joining the substrates or parts, and
   (iv) optionally exposing solvent or other liquid vehicle in the accelerator composition from the second part of the system according to claim 1 to air, optionally with heating and/or with the aid of a fan.

13. A bonded assembly of substrates or parts bonded by a process according to claim 12.

14. An article of commerce comprising a substrate or part and the system according to claim 1.

15. A process for the bonding of substrates or parts, characterised by the following series of steps:
   (i) applying a cyanoacrylate adhesive from the one part of the system according to claim 1 onto at least one surface of the substrates or parts to be joined;
   (ii) joining the substrates or parts, optionally with manual or mechanical fixing;
   (iii) dispensing an accelerator composition from the second part of the system as according to claim 1 wherein component (b) is a solvent mixture which comprises a volatile hydrocarbon and a cyclic ketone, onto the adhesive before or after the step of joining the substrates or parts, and
   (iv) optionally exposing the solvent mixture in the accelerator composition to air, optionally with heating or with the aid of a fan.

16. A bonded assembly formed by the process of claim 15.

* * * * *